United States Patent [19]
Sanemitsu

[11] Patent Number: 5,383,161
[45] Date of Patent: Jan. 17, 1995

[54] IC CARD WITH DECODER FOR SELECTIVE CONTROL FOR MEMORY STORAGE

[75] Inventor: Yoshikado Sanemitsu, Itami, Japan

[73] Assignee: Mitsubishi Denki Kabushiki Kaisha, Tokyo, Japan

[21] Appl. No.: 101,790

[22] Filed: Aug. 4, 1993

Related U.S. Application Data

[63] Continuation of Ser. No. 709,890, Jun. 4, 1991, abandoned.

[30] Foreign Application Priority Data

Oct. 3, 1990 [JP] Japan .................. 2-263869

[51] Int. Cl.⁶ .............................................. G11C 8/00
[52] U.S. Cl. .................. 365/230.06; 365/228; 365/189.05
[58] Field of Search .............. 365/218, 228, 230.06, 365/189.05; 235/380, 382

[56] References Cited

U.S. PATENT DOCUMENTS

| | | | |
|---|---|---|---|
| 4,910,774 | 3/1990 | Barakat | 380/23 |
| 4,928,001 | 5/1990 | Masada | 235/380 |
| 4,931,997 | 6/1990 | Mitsuishi et al. | 365/228 |
| 5,058,074 | 10/1991 | Sakamoto | 365/228 |

FOREIGN PATENT DOCUMENTS

0331407  9/1989  European Pat. Off.
1504196  3/1978  United Kingdom.

*Primary Examiner*—John S. Heyman
*Attorney, Agent, or Firm*—Leydig, Voit & Mayer

[57] ABSTRACT

An IC card includes a first semiconductor memory, such as a 256K bit RAM, for storing main data; a second semiconductor memory, such as a 64K bit EEPROM, for storing physical information concerning the IC card, e.g., size, capacity, and access time; a control circuit for selectively enabling operation of the first and second semiconductor memories; an address BUS connected to the first and second semiconductor memories; a data BUS connected to the first and second semiconductor memories; and a decoder connected to the address BUS and the second semiconductor memory for decoding a write control signal for the second semiconductor memory using part of an address signal from the address BUS and delivering a decoded write control signal to the second semiconductor memory to control storing of data in the second semiconductor memory. Consequently, the area in the second semiconductor memory is divided into a non-writable region which does not permit overwriting of stored data and a writable region which permits overwriting of stored data.

4 Claims, 3 Drawing Sheets

| A11 | A12 | WE | WED |
|-----|-----|----|----|
| X | X | H | H |
| L | L | L | H |
| H | L | L | L |
| L | H | L | L |
| H | H | L | L |

IC CARD WITH DECODER FOR SELECTIVE CONTROL FOR MEMORY STORAGE

This application is a continuation of application Ser. No. 07/709,890, filed Jun. 4, 1991, now abandoned.

BACKGROUND OF THE INVENTION

1. Field of the Invention

The present invention relates to an IC card and, more particularly, to an IC card which has, in addition to a semiconductor memory for storing the main data, a semiconductor memory for storing physical information concerning the card and format information concerning the data in the card.

2. Description of the Related Art

FIG. 4 shows an IC card of the type described above. The IC card has a 256K bit static random access memory (RAM) 1 serving as an area for storing main data, and a 64K bit electrically erasable programmable read-only memory (EEPROM) for storing physical information concerning the IC card, e.g., type and capacity of the memory, access time and so on, as well as format information concerning the data stored in the IC card. A mode control circuit 3 is connected to the static RAM 1 and the EEPROM 2. In addition, all the address signal lines $A_0$ to $A_{14}$ of an address BUS 5 are connected to the static RAM 1. Selected address signal lines $A_0$ to $A_{12}$ of the BUS are also connected to the EEPROM 2. Furthermore, a data BUS 7 including 8-bit data signal lines $D_0$ to $D_7$ is connected to the static RAM 1 and also to the EEPROM 2.

The mode control circuit 3 receives a card enable signal $\overline{CE}$ and a memory selection signal $\overline{REG}$. A chip enable signal $S_1$ of "L" level is delivered to the static RAM 1 when the card enable signal $\overline{CE}$ is "L" while the memory selection signal $\overline{REG}$ is "H" level. When both the card enable signal $\overline{CE}$ and the memory selection signal $\overline{REG}$ are "L" level, a chip enable signal $S_2$ of "L" level is delivered to the EEPROM 2.

The operation of this IC card is as follows. When it is desired to use the static RAM 1, a terminal device which is not shown sets the card enable signal $\overline{CE}$ to "L" level and set the memory selection signal $\overline{REG}$ to "H" level. As a result, a chip enable signal $S_1$ of "L" level is delivered from the mode control circuit 3 to the static RAM 1 so that the static RAM 1 becomes ready to operate. In this state, and address is selected through the address signal lines $A_0$ to $A_{14}$, and read control signal $\overline{OE}$ and write control signal $\overline{WE}$ are respectively set to "L" and "H" levels, so that data stored in the selected address of the RAM 1 appears on the data BUS 7. Conversely, when the read control signal $\overline{OE}$ and the write control signal $\overline{WE}$ are respectively set to "H" and "L" levels, data on the data BUS 7 are written in the selected address of the static RAM 1. The data in the static RAM 1 is lost when the power supply is turned off.

On the other hand, when the EEPRM 2 is to be used, both the card enable signal $\overline{CE}$ and the memory selection signal $\overline{REG}$ are set to "L" levels. As a result, a chip enable signal $S_2$ of "L" level is delivered to the EEPROM 2 from the mode control circuit 3, thereby enabling the EEPROM 2 to operate. Reading and writing of data are conducted in the same manner as those in the case of the static RAM 1. The data in the EEPROM 2 is not lost even when the power supply is turned off.

When both the static RAM 1 and the EEPRM 2 are not to be used, the card enable signal $\overline{CE}$ is set to "H" level. In this case, both the chip enable signals $S_1$ and $S_2$ are set to "H" so that the static RAM 1 and the EEPROM 2 become inoperative.

In this known IC card, the EEPROM 2 can be accessed easily through a terminal device (not shown) as described above, so that a problem has been encountered that physical information concerning the card and stored in the EEPRM 2 may be rewritten accidentally or willfully.

SUMMARY OF THE INVENTION

Accordingly, an object of the present invention is to provide an IC card which prevents physical information stored therein from being easily rewritten through a terminal device.

To this end, according to the present invention, there is provided an IC card comprising: a first semiconductor memory for storing main data; a second semiconductor memory for storing physical information concerning the IC card; a control circuit connected the first and second memories for selectively enabling operation of the first and second semiconductor memories; an address BUS connected to the first and second semiconductor memories; a data BUS connected to the first and second semiconductor memories; and a decoder connected to the address BUS and the second semiconductor memory for decoding a write control signal for the second semiconductor memory using part of an address signal on the address BUS and delivering the decoded write control signal to the second semiconductor memory to control storing of data in the second semiconductor memory.

In the present invention, the decoder decodes the write control signal for the second semiconductor memory by using part of the address signal to give access to the second semiconductor memory, whereby a part of the second semiconductor memory is changed into a nonwritable area.

DESCRIPTION OF THE PREFERRED EMBODIMENT

A preferred embodiment of the present invention will be described with reference to the accompanying drawings.

Figure 1:
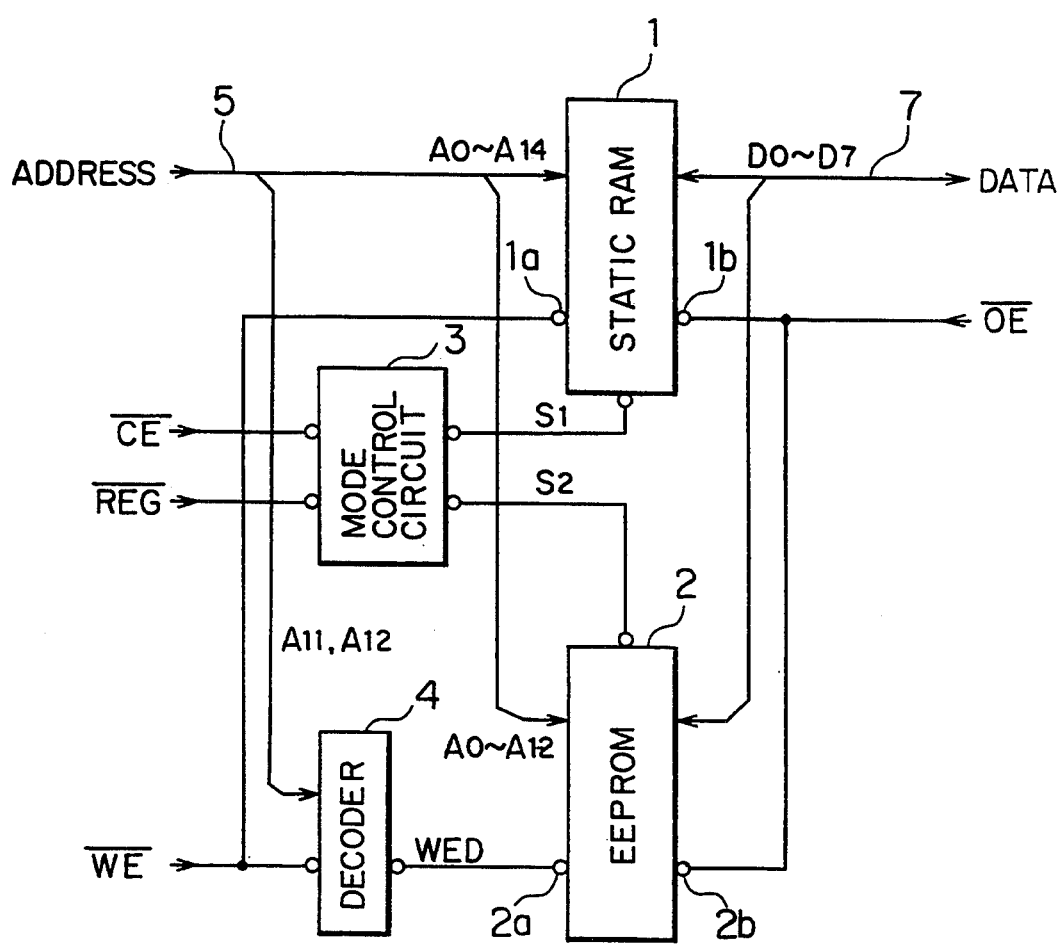
FIG. 1 is a block diagram of an IC card in accordance with an embodiment of the present invention.

Referring to FIG. 1, an IC card embodying the present invention has a 256K bit static RAM 1 which provides an area for storing main data, and a 64K bit EEPROM 2 for storing physical information concerning the IC card, e.g., type and capacity of the memory, access time and so on, as well as format information concerning data stored in the IC card. A mode control circuit 3 is connected both to the static RAM 1 and the EEPROM 2. All the address signal lines $A_0$ to $A_{14}$ of an address RUS 5 are connected to the static RAM 1, and selected address lines $A_0$ to $A_{12}$ are also connected to the EEPROM 2. A data BUS 7 formed of 8-bit signal lines $D_0$ to $D_7$ is connected to both the static RAM 1 and the EEPROM 2.

The mode control circuit 3 receives a card enable signal $\overline{CE}$ and a memory selection signal $\overline{REG}$. When the card enable signal $\overline{CE}$ is "L" level while the memory selection signal $\overline{REG}$ is "H" level, the mode control circuit 3 delivers a chip enable signal $S_1$ of "L" level to the static RAM 1, whereas, when both the card enable signal $\overline{CE}$ and the memory selection signal $\overline{REG}$ are "L" level, the mode control circuit 3 delivers a chip enable signal $S_2$ of "L" level to the EEPROM 2.

A decoder 4 is connected to a write control input terminal $2a$ of the EEPROM 2. Two signal lines $A_{11}$ and $A_{12}$ of the address BUS 5 are connected to the decoder 4. The decoder 4 decodes a write control signal $\overline{WE}$ in accordance with the levels on the signal lines $A_{11}$ and $A_{12}$ and delivers to the EEPROM 2 a new write control signal WED shown in FIG. 2. More specifically, when both the signal lines $A_{11}$ and $A_{12}$ are "L" level, the decoder 4 decodes the write control signal $\overline{WE}$ of "L" level a write control signal pan the decoder 4 is "H" level, and thereby prohibiting writing in the EEPROM 2.

The write control signal $\overline{WE}$ is directly supplied to a write control input terminal $1a$ of the static RAM 1. A read control signal $\overline{OE}$ is input both to the read control signal input terminals $1b$ and $2b$ of the static RAM 1 and the EEPROM 2.

In the described embodiment, the static RAM 1 serves as the first semiconductor memory, while the EEPROM 2 serves as the second semiconductor memory.

The operation of this embodiment is as follows.

When it is desired to use the static RAM 1, a terminal device (not shown) sets the card enable signal $\overline{CE}$ to "L" level, while setting the memory selection signal $\overline{REG}$ to "H" level. Consequently, the mode control circuit 3 delivers a chip enable signal $S_1$ of "L" level to the static RAM 1, thus enabling the static RAM 1 to operate. In this state, when the desired address is selected through the address signal lines $A_0$ to $A_{14}$ of the address BUS 5, while the read control signal $\overline{OE}$ and the write control signal $\overline{WE}$ are respectively set to "L" and "H" levels, the data in the selected address of the static RAM 1 appears on the data BUS 7. Conversely, when the read control signal $\overline{OE}$ and the write control signal $\overline{WE}$ are respectively set to "H" and "L" levels, the data on the data BUS 7 are written in the selected address of the static RAM 1. The data in the static RAM 1 is lost when the power is turned off.

On the other hand, when the EEPROM 2 is to be used, both the card enable signal $\overline{CE}$ and the memory selection signal $\overline{REG}$ are set to "L" level. Consequently, a chip enable signal $S_2$ of "L" level is delivered from the mode control circuit 3 to the EEPROM 2, thus enabling the EEPROM 2 to operate.

The operation for reading data from the EEPROM 2 is conducted in the same manner as that in the case of the static RAM 1. Namely, the data stored in the address of the EEPROM 2 selected through the address signal lines $A_0$ to $A_{12}$ of the address BUS 5 appears on the data BUS 7 when the read control signal $\overline{OE}$ and the write control signal $\overline{WE}$ are respectively set to "L" and "H".

For writing data in the EEPROM 2, the address in which the data is to be written is selected through the address signal lines $A_0$ to $A_{12}$ of the address BUS 5, and the read control signal $\overline{OE}$ and the write control signal $\overline{WE}$ are respectively set to "H" and "L" levels. The write control signal $\overline{WE}$ is input to the decoder 4 so as to be decoded in accordance with the levels of the signal lines $A_{11}$ and $A_{12}$ connected to the decoder 4. As will be seen from FIG. 2, in the cases other than the case where both the signal lines $A_{11}$ and $A_{12}$ are of "L" level, i.e., when one of the addresses 800 to 1FFF in hexadecimal notation has been selected, the write control signal $\overline{WE}$ of "L" level is input to the EEPROM 2 as a new write control signal WED while maintaining the level "L". Consequently, the data on the data BUS 7 is written in the selected address of the EEPROM 2. Conversely, when both the signal lines $A_{11}$ and $A_{12}$ are of "L" level, i.e., when one of addresses 0 to 7FF in hexadecimal notation has been selected, a write control signal $\overline{WE}$ of the "L" level is decoded into a new write control signal WED of "H" level, and this new write control signal WED is input to the EEPROM 2, so that the writing of data in the EEPROM 2 is prohibited.

Figures 2, 3:
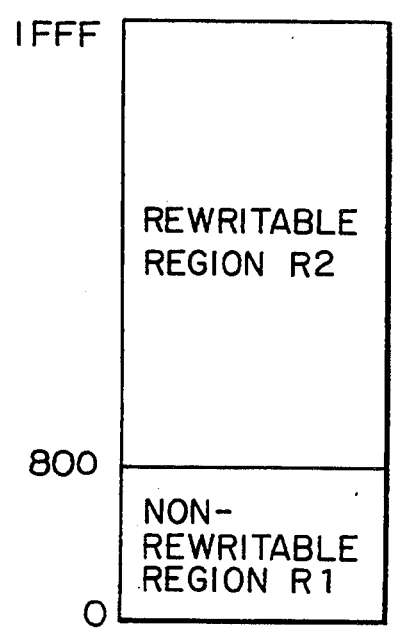
FIG. 2 is an illustration of the operation of a decoder 4 incorporated in the embodiment shown in FIG. 1.
FIG. 3 is an illustration showing an arrangement of memories in an EEPROM.
Figure 4:
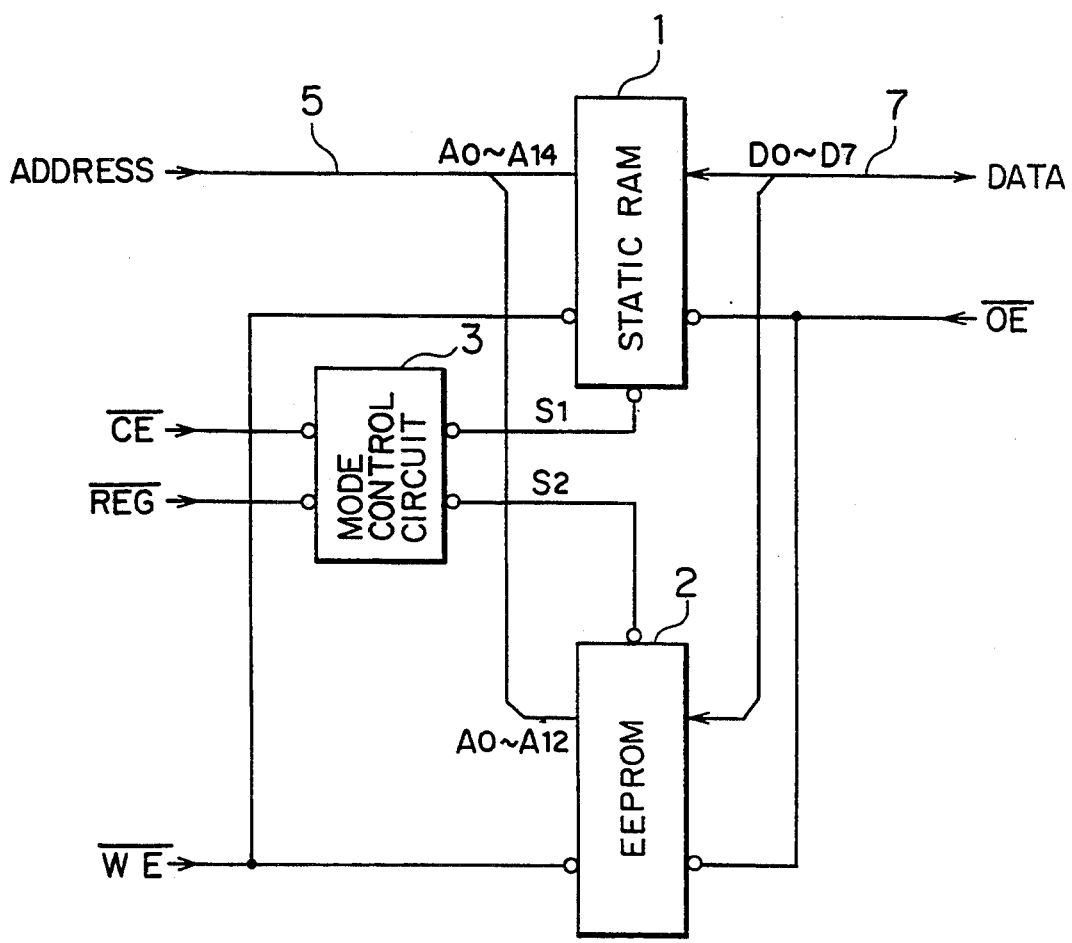
FIG. 4 is a block diagram of a conventional IC card.

Thus, in the described embodiment, as shown in FIG. 3, the area of the addresses 0 to 7FF of the EEPROM 2 forms a non-rewritable region R1, while the area of addresses 800 to 1FFF forms a rewritable region R2. Therefore, the physical information concerning the IC card, which should not be rewritten easily, is stored in this non-rewritable region R1, while other information such as format information for the data is stored in the rewritable region R2. The physical information concerning the card, stored in the memory region R1, cannot easily be rewritten through the terminal device. The data in the EEPROM 2 is not lost even when the power is turned off.

When neither the static RAM 1 and EEPROM 2 are to be used, the card enable signal $\overline{CE}$ input to the mode control circuit 3 is set to "H" level. In this case, the chip enable signals $S_1$ and $S_2$ are set to "H" level regardless of the level of the memory selection signal $\overline{REG}$, so that both the static RAM 1 and the EEPROM 2 become inoperative.

Although a 256K bit static RAM 1 is used as the first semiconductor memory in the described embodiment, this is not exclusive and semiconductor memories of different types and capacities can be used equally well. It is also to be understood that the 64K bit EEPROM 2 can be replaced by another suitable writable semiconductor memory. The described decoding method performed by the decoder 4 also is illustrative and the same effect can be obtained also when other decoding methods are used.

As will be understood from the foregoing description, in the IC card of the present invention, the physical information concerning the IC card is not easily rewritable through a terminal device, so that the reliability of the IC card can be greatly improved.

What is claimed is:
1. An IC card comprising:
a first semiconductor memory for storing main data;
a second semiconductor memory for storing physical information concerning the IC card;
a control circuit connected to said first and second semiconductor memories for selectively enabling operation of said first and second semiconductor memories;
an address BUS connected to said first and second semiconductor memories and including a plurality of signal lines respectively corresponding to bits of addresses of memory locations in said first and second memories;

a data BUS connected to said first and second semiconductor memories; and a decoder connected to at least two of said signal lines of said address BUS and said second semiconductor memory for decoding a write control signal applied to said decoder and signals on said signal lines of said address BUS connected to said decoder to produce a decoded write control signal applied to said second semiconductor memory to control storing of data in said second semiconductor memory whereby said second semiconductor memory has a non-rewritable memory region and a rewritable memory region selectively accessible in response to the signals on said signal lines of said address bus connected to said decoder.

2. An IC card according to claim 1 wherein said physical information concerning the IC card is stored in said non-rewritable memory region.

3. An IC card according to claim 1 wherein said second semiconductor memory is an electrically erasable programmable read-only memory.

4. An IC card comprising: a semiconductor memory having a plurality of memory locations for storing data, a plurality of address inputs for selecting memory locations from the plurality of memory locations, a data input for inputting data to be stored in the semiconductor memory, and a write enable input for enabling storing of the data in the semiconductor memory;

a plurality of address lines respectively connected to the plurality of address inputs;

a write enable signal line;

a decoder having inputs connected to the write enable signal line and at least two of the plurality of address lines and an output connected to the write enable input, dividing the plurality of memory locations into a non-rewritable memory region and a rewritable memory region selectively accessible in response to signals on the address lines connected to the decoder and on the write enable signal line.

* * * * *